United States Patent Office 3,639,371
Patented Feb. 1, 1972

3,639,371
POLYMERISATION OF CYCLOOLEFINS USING MOLYBDENUM OR TUNGSTEN HALIDE OR OXYHALIDE AND ALUMINUM HALIDE CATALYSTS
Philip Ronald Marshall and Brian John Ridgewell, Hythe, Southampton, England, assignors to The International Synthetic Rubber Company Limited, Southampton, England
No Drawing. Filed Feb. 18, 1969, Ser. No. 800,255
Claims priority, application Great Britain, Feb. 23, 1968, 8,961/68
Int. Cl. C08f 7/02
U.S. Cl. 260—93.1          23 Claims

ABSTRACT OF THE DISCLOSURE

A process for the polymerisation of at least one cyclic olefin containing 4, 5 or 7 or more ring carbon atoms in the substantial absence of polar compounds and under non-oxidising conditions comprises contacting the said olefin(s) with a catalyst comprising (a) a halide or oxyhalide of molybdenum or tungsten, wherein the oxidation state of the metal is 4, 5 or 6 and
(b) an aluminium trihalide In one embodiment, polymers having 50% or more of the chain carbon atoms contained in isobutylene units are obtained by the polymerisation of cyclic olefins.

---

The invention relates to a process for the production of unsaturated polymers and copolymers from cyclic olefin monomers.

The ring opening polymerisation of such monomers has been described in British patent specification Nos. 1,062,-367 and 1,043,360.

In the process described and claimed in specification No. 1,062,367 the catalyst comprises a mixture of a molybdenum or tungsten salt, an organometallic or metal hydride compound of a Group II or Group III metal and molecular oxygen or oxygen-containing compound having an oxygen-oxygen or oxygen-hydrogen bond.

The process described and claimed in specification No. 1,043,360 employs a Friedel Crafts catalyst such as AlCl$_3$ or TiCl$_4$, an oxidising agent such as CuCl$_2$, FeCl$_3$, PbCl$_4$ or PbNO$_3$ and advantageously includes traces of water or alcohols in the reaction mixture.

The product of the process of 1,062,367 is a rubbery hydrocarbon-soluble material whereas that of 1,043,360 is a hydrocarbon-insoluble, predominantly crystalline product and it is clear that the catalyst systems function differently in each case.

The present application discloses a simple process which enables polymers to be produced from cyclic olefins without using metal alkyls, alkyl halides, or hydrides or oxidising conditions. Hence, it is both simpler to operate, cheaper and safer than existing processes.

According to the present invention we provide a process for the polymerisation of at least one cyclic olefin containing 4, 5 or 7 or more ring carbon atoms, in the substantial absence of polar compounds and under non-oxidising conditions by means of a ctalyst comprising:

(a) A halide or oxyhalide of molybdenum or tungsten, wherein the oxidation state of the metal is 4, 5 or 6 and
(b) An aluminium trihalide.

Examples of suitable (a) components are tungsten hexachloride, tungsten pentachloride, tungsten hexabromide, tungsten oxytetrachloride, molybdenum pentachloride and molybdenum oxydichloride. The fluorides of tungsten or molybdenum may be used but their use is not desirable because they are generally volatile and/or readily hydrolysed. The tungsten or molybdenum compound is preferably but not essentially soluble in the reaction medium. For this reason molybdenum pentachloride and particularly tungsten hexachloride, are especially suitable.

Examples of component (b) of the catalyst system are aluminium tribromide and aluminium triiodide. Of these aluminium tribromide is preferred because of its solubility and stability. Aluminium trichloride which has been made at least partially soluble in the reaction medium by formation of an adduct with a polar compound may also be used. By partial solubility we mean that the aluminium trichloride has been rendered sufficiently soluble for the solution of the adduct to catalyse the polymerisation. It is preferred that such an adduct be completely soluble since an incompletely soluble adduct leads to difficulties in controlling the reaction because of polymer build-up on the insoluble portion. Examples of suitable polar compounds for rendering soluble the aluminium trichloride are dialkyl, diaryl, or alkyl aryl ethers or thioethers, aliphatic, aromatic or aliphatic-aromatic nitrile or tertiary amines. Generally equimolar quantities of the polar compound and the aluminium trichloride are used in preparing the adducts. (In this specification unless otherwise indicated "alkyl" includes aralkyl.) Particularly suitable compounds are di-n-butyl ether, diisoamylether, methyl, orthotolyl ether, anisole and alkyl substituted anisole.

The presence of an inert solvent as the reaction medium is desirable, although not essential, since in this way the reaction can be moderated and heat dissipated. In some cases however the monomer(s) may be used alone as the reaction medium. Examples of suitable additional solvents are hexane, cyclohexane, isooctane, benzene, toluene and chloroform.

The molar ratio between component (b) and component (a) should generally be in the range 0.1:1 to 100:1, preferably 1:1 to 50:1. The molecular weight of the product is controlled by varying the concentration of component (a) with respect to the monomer(s). It has been found that the lower the concentration of this component the higher is the molecular weight of the polymer and generally to obtain a polymer of molecular weight not exceeding 200,000, a component (a) concentration of from about 10 to 20 m. moles per litre of monomer are very suitable. Variation of the ratio of the catalyst components markedly affects the rate of reaction higher component (b) concentrations leading to faster reactions. The monomer(s) and catalyst components can be mixed in any order.

The process is generally carried out at a temperature from −50° C. to 100° C. preferably 10° C. to 80° C. and at an absolute pressure of from 1–5 atmospheres. Under these conditions rapid polymerisations with a high conversion to high molecular weight products occur.

The process described herein, unlike those previously described, must be carried out in the substantial absence of polar compounds such as water, ethers, oxygen, alkali metal salts, peroxides, ketones, alcohols, etc. Those in the art will appreciate that these are conditions similar to those demanded for the so-called Ziegler-Natta catalysts. However the catalysts described in the present invention do not contain compounds with a metal-carbon or a metal-hydrogen bond.

The cyclic olefins which may be polymerised and copolymerised in the process of the invention contain 4, 5 or 7 or more ring carbon atoms. The invention does not apply to cyclic olefins having 6 membered rings on account of their exceptional stability. By variation of the ring size, the number and position of the carbon-carbon double bonds and the substituents on the ring, a variety of products may be obtained and these may have different degrees of unsaturation. Examples of mono-unsaturated olefins which may be polymerised using this catalyst are cyclopentene, cycloheptene, cyclooctene and cis- or trans-cyclododecene. Examples of suitable polyunsaturated olefins are cis, cis-1,5-cyclooctadiene and cis, trans, trans-1,5,9-cyclodedecatriene. Commonly such olefins have up to 20 ring carbon atoms. These and higher cycloolefins may be prepared using conventional techniques e.g. oligomerization, condensation or cyclization.

On polymerisation the carbon-carbon double bond(s) in the monomer is or are retained in the final polymer and depending on the ring size and the number of such bonds in the monomer it is possible to prepare polymers having different carbon chain lengths between the unsaturations. Thus, for examples, polymers prepared from cis, cis-1,5-cyclooctadiene are identical to polybutadiene with no 1,2-(vinyl) structures present, a predominance of cis 1,4 structures being observed. Similarly polymerisation of cis, trans, trans-1,5-9-cyclododecatriene gives a polybutadiene having a predominance of trans-1,4 structures with no pendant vinyl groups, and cis-cyclododecene-1 gives a product which corresponds to an ethylene-butadiene copolymer.

Where the cyclic olefin contains more than one carbon-carbon double bond, as for example in 1,5-cyclooctadiene, rubbery products soluble in the reaction medium are generally obtained if these bonds are non-conjugated. Conversely, cyclic olefins containing conjugated double bonds generally yield plastic or powdery products, insoluble in the reaction medium.

The ring carbon atoms of common cyclic olefins have hydrogen atoms attached thereto and such olefins yield unbranched products. Olefins having ring carbon atoms with other atoms or radicals attached may be used in the process of the invention. These substituents must not be so bulky as to hinder sterically the polymerisation reaction. Thus, examples of suitable substituents are hydrocarbyl groups and halogens. Selection of these substituents must be such that at the double bond(s) there occur units of the formula:

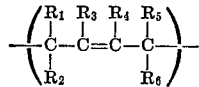

where $R_1$ to $R_6$ are hydrogen or hydrocarbyl groups or halogen and the total number of carbon atoms in the substituent groups does not exceed 12, and preferably does not exceed 2.

In one embodiment of the invention we provide unsaturated polymers of which 50% or more of the chain carbon atoms are contained in isobutylene

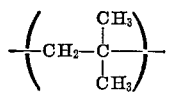

units obtained by the polymerisation of a cyclic olefin having 4, 5 or 7 or more ring carbon atoms and containing at least one such isobutylene unit and not more than one carbon-carbon double bond for every such unit.

Such polymers generally have from 1 to 4 carbon-carbon double bonds for every 60 carbon atoms in the polymer chain and may be prepared from cyclic olefins having up to 100 ring carbon atoms. Polymers prepared from olefins having up to 12 ring carbon atoms are relatively unsaturated and are comparable with conventional butadiene and isoprene (co) polymers whereas those prepared from mono-olefins having at least 14 ring carbon atoms are more highly saturated and are comparable with, for example, the known butyl and ethylene-propylene rubbers.

Particularly interesting products may be obtained by polymerisation of cyclic olefins consisting of units A and B:

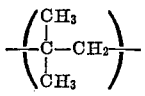 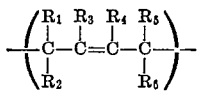

where $R_1$ to $R_6$ are hydrogen or hydrocarbyl groups or halogen and the total number of carbon atoms in the substituent groups does not exceed 12, and preferably does not exceed 2. Of especial interest are polymers obtained from such cyclic olefins of which, in the unit(s) B, either all the groups $R_1$ to $R_6$ are hydrogen or the group $R_3$ is methyl and $R_1$, $R_2$ and $R_4$ to $R_6$ are hydrogen. An example of such polymers is that obtained from the polymerisation of 4, 4, 6, 6- or 5, 5, 6, 6-tetramethyl cyclooctene (i.e. where all the groups $R_1$ to $R_6$ of unit B above are hydrogen) which corresponds to an isobutylene-butadiene polymer contained in a molar ratio of 2 to 1. Similarly polymerisation of the same monomer but having a methyl group attached to the double bond (i.e. where the group $R_3$ of unit B above is methyl and $R_1$, $R_2$ and $R_4$ to $R_6$ are hydrogen) yields a product corresponding to an isobutylene-isoprene polymer in a molar ratio of 2 to 1. By polymerization of olefins having, for example, 29 units of type A above and one of type B it is possible to obtain an isobutylene polymer having one unsaturation for every 60 carbon atoms.

In this aspect of the invention the polymerisation of the specified cyclic olefins may be brought about using the catalysts described above comprising a tungsten/molybdenum halide or oxyhalide and aluminium trihalide, or there may be used other processes for polymerising cyclic olefins such as those described in the above mentioned U. K. patent specifications Nos. 1,062,367 and 1,043,360.

The following examples illustrate the invention (Examples 7 and 8 are included for comparison):

EXAMPLE 1

The experiment was carried out in a 1 pint crown capper pressure bottle which had been thoroughly dried and flushed with anhydrous oxygen-free nitrogen. To a solution of 10 ml. (82 mmole) of cycloocta-1,5-diene in 50 ml. dry, oxygen-free hexane contained in the bottle was added 0.14 mmole $WCl_6$ and 0.50 mmole $AlBr_3$. After one hour at room temperature the polymerisation was terminated by adding methanol and the polymer was precipitated using a mixture of acetone and methanol. After drying at 40° C. in vacuo the yellow, tacky rubber weighed 2.2 gm. (25% conversion). The infra-red showed the polymer to be polybutadiene and to have the following microstructure as determined from the infra-red spectrum according to the method of L. Hampton, Analytical Chemistry, 1949, 21 923: cis 1,4 76%, trans 1,4 24%, vinyl 0%. The dilute solution viscosity (DSV) determined as a 0.1% w./v. solution in benzene at 25° C. was 1.5 which corresponds to a molecular weight of approximately 98,000. The gel content was 0.1% w./w. which was determined by shaking the polymer in benzene (0.5% solution) in a flask in a water bath at 25° C. for 2 days and then filtering through very fine gauze.

EXAMPLE 2

The method of Example 1 was used except that the catalyst quantities were 0.175 mmole $WCl_6$ and 0.50 mmole $AlBr_3$. The polymerisation was stopped as before and the polymer precipitated. 3.4 gm. (38%) of slightly tacky rubber was obtained having the microstructure cis-1,4 75%, trans, 1,4 25%, vinyl 0%. It had D.S.V. 1.0 (≡M. W. of approximately 59,000) and the gel content was 0.8%.

EXAMPLE 3

Under the conditions used in Example 1, 0.035 mmole $WCl_6$ and 0.50 mmole $AlBr_3$ were added to 82 mmole cyclooctadiene in hexane. A rapid reaction commenced evolving heat. The solution became very viscous and was solid after one hour. Isolation of the polymer (8.8 g., 100% yield) showed that it had a high molecular weight (DSV 5.0), (≡M.W. of approximately 450,000). The microstructure was cis-1,4 85% trans 1,4 15% vinyl 0.0% and the gel content was 2%.

EXAMPLE 4

The same procedure as in Example 1 was used except that cis, trans, trans, 1,5,9 cyclododecatriene was used as monomer (16.2 g., 100 mmole). The polymer produced (5.2 g. 30% yield) was rubbery and infrared spectroscopy showed it to be polybutadiene of microstructure cis-1,4 30%, trans-1,4 70%, vinyl 0.0%. It had D.S.V. 2.0 (≡M.W. approximately 141,000) and gel content 1%.

EXAMPLE 5

The procedure as in Example 1 was used except that a mixture of 100 mmoles (11.2 g.) cis, 1,5 cyclooctadiene and 100 mmoles (16.2 g.) ics, trans, trans 1,5,9-cyclododecatriene were used as comonomers. The reaction product (8.6 g.) was polybutadiene with a microstructure of cis 1,4 49%, trans 1,4 51% vinyl 0.0%. The mother liquor from the polymerisation was carefully distilled and 7.1 g. cyclooctadiene and 11.7 cyclododecatriene were recovered. This together with the microstructure clearly indicate that copolymerisation had occurred. The product had a D.S.V. of 2.2 (M.W.≡approximately 142,000) and a gel content of 0.9%.

EXAMPLE 6

The procedure of Example 3 was used except that cis cyclododecene-1 (100 mmole, 16.6 g.) was used in place of cyclooctadiene. The product (8.9 g. 53% conversion) was a rubber which had the infrared spectrum of an ethylene-butadiene copolymer containing 80 moles percent ethylene and 20 moles percent butadiene. The butadiene portion had the microstructure cis-1,4 80%, trans-1,4 20%. The D.S.V. was determined in cyclohexane at 30° at 2.2. Gel content was 3%.

EXAMPLE 7

The procedure of Example 1 was used except that no tungsten hexachloride was used. No polymer was produced.

EXAMPLE 8

The procedure of Example 1 was used except that no aluminium bromide was used. No polymer was produced.

EXAMPLE 9

6.66 ml. of cyclooctadiene-1,5 was added to 16.94 ml. of cyclohexane in a glass bottle which had been dried and flushed as in Example 1. To this was added 1.67 mmoles per litre of monomer+solvent of tungsten oxytetrachloride which had been premixed for 24 hours with 33.4 mmoles per litre of monomer of a 1:1 molar adduct of aluminium trichloride and anisole. After 65 minutes at 20° C. a slightly viscous solution was obtained. On terminating the reaction and drying the product as in Example 1 a colourless sticky material was obtained.

EXAMPLE 10

Example 9 was repeated except that the catalyst components used were tungsten oxytrichloride (21.9 mmoles per litre of monomer) and an aluminium trichloride-anisole 1:1 adduct (102.0 mmoles per litre of monomer). These were added directly to the monomer, the cyclohexane solvent being omitted. After 2½ minutes at room temperature the reaction was terminated as in Example 1 and the product isolated and dried. Conversion to polymer was 15% and the product had the microstructure cis 1,4 84% trans 1,4 16% vinyl 1,2 0%, a D.S.V. of 2.9 and on analysis was found to contain no chlorine.

If the above examples are repeated using molybdenum pentachloride as component (a) instead of the tungsten compound, essentially similar results are obtained.

What we claim is:

1. A process for the polymerisation of at least one cyclic olefin containing 4, 5 or 7 or more ring carbon atoms in the absence of polar compounds and under non-oxidising conditions by means of a catalyst comprising:
   (a) a halide or oxyhalide of molybdenum or tungsten, wherein the oxidation state of the metal is 4,5 or 6 and
   (b) an aluminium trihalide.

2. A process according to claim 1 wherein component (a) of the catalyst system is a halide or oxyhalide of tungsten of oxidation state six ($W^{VI}$).

3. A process according to claim 1 wherein the molybdenum or tungsten halide or oxyhalide is tungsten hexachloride, tungsten pentachloride, tungsten hexabromide, tungsten oxytetrachloride, molybdenum pentachloride or molybdenum oxydichloride.

4. A process according to claim 1 wherein the aluminium trihalide is aluminium tribromide or aluminium triiodide.

5. A process for the polymerization of at least one cyclic olefin containing 4, 5, or 7 or more ring carbon atoms under non-oxidizing conditions by means of a catalyst comprising (a) a halide or oxyhalide of molybdenum or tungsten, wherein the oxidation state of the metal is 4, 5, or 6 and wherein the aluminium trichloride which has been made at least partially soluble in the reaction medium by formation of an adduct with a polar compound.

6. A process according to claim 5 wherein the polar compound is a dialkyl, diaryl or alkyl aryl ether or thioether, an aliphatic, aromatic or aliphatic-aromatic nitrile or tertiary amine.

7. A process according to claim 6 wherein the polar compound is di-n-butyl ether, diisoamyl ether, methyl orthotolyl ether, anisole or an alkyl substituted anisole.

8. A process according to claim 5 wherein the aluminium trihalide is an adduct of aluminium trichloride with an equimolar quantity of anisole which adduct is soluble in the reaction medium.

9. A process according to claim 1 wherein the molar ratio of component (b) to component (a) is 0.1:1 to 100:1.

10. A process according to claim 1 wherein the molar ratio of component (b) to component (a) is 1:1 to 50:1.

11. A process according to claim 1 wherein the cyclic olefin contains 5 or 7 to 20 ring carbon atoms.

12. A process according to claim 11 wherein the cyclic olefin is cyclopentene, cycloheptene, cyclooctene, cis or trans cyclododecene cis, cis 1,5-cyclooctadiene or cis, trans trans 1,5,9-cyclododecatriene.

13. A process according to claim 11 wherein the cyclic olefin is cyclopentadiene, cycloheptatriene or dicyclopentadiene.

14. A process according to claim 1 wherein the polymerisation is carried out in an inert solvent.

15. A process according to claim 1 in which the solvent is hexane, cyclohexane, isooctane, benzene, toluene or chloroform.

16. A process according to claim 1 wherein the polymerisation is carried out at a temperature from −50° C. to 100° C.

17. A process according to claim 16 wherein the temperature is from 10° C. to 80° C.

18. A process according to claim 1 wherein the polymerisation is carried out at an absolute pressure of from 1 to 5 atmospheres.

19. A process according to claim 5 wherein the polar compound is di-n-butyl ether, diisoamyl ether, methyl orthotolyl ether, anisole or an alkyl substituted anisole.

20. A process according to claim 1 wherein there is employed a cyclic olefin containing at least one isobutylene unit

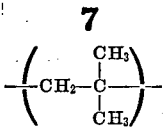

and not more than one carbon double bond for every such unit to produce a polymer containing at least 50% of the chain carbon atoms in isobutylene unit.

21. A process according to claim 20 wherein the cyclic olefin employed provides 1 to 4 carbon-to-carbon double bonds for every 60 carbon atoms in the polymer chain.

22. A process according to claim 20 wherein the cyclic olefin employed has up to 100 ring carbon atoms.

23. A process according to claim 20 wherein the cyclic olefin employed has at least 14 ring carbon atoms.

References Cited
UNITED STATES PATENTS

| | | | |
|---|---|---|---|
| 3,066,123 | 11/1962 | Stohmayer et al. | 260—93.1 |
| 3,074,918 | 1/1963 | Eleuterio | 260—93.1 |
| 3,342,972 | 9/1967 | Toekelt | 260—93.1 |
| 3,449,310 | 6/1969 | Dall' Asta et al. | 260—93.1 |
| 3,459,725 | 8/1969 | Natta et al. | 260—93.1 |
| 3,476,728 | 11/1969 | Natta et al. | 260—93.1 |

OTHER REFERENCES

Natta et al.: Makromol. Chemie, 91, pp. 87–106, 1966.

JOSEPH L. SCHOFER, Primary Examiner

R. A. GAITHER, Assistant Examiner

U.S. Cl. X.R.

260—88.2 A, 94.8